United States Patent Office 3,514,926
Patented June 2, 1970

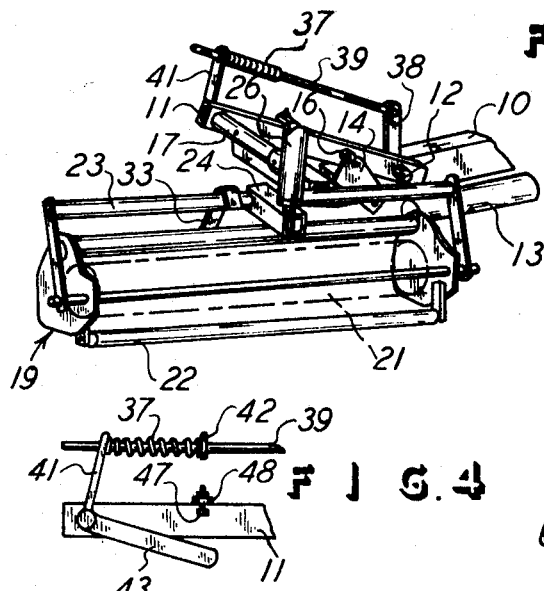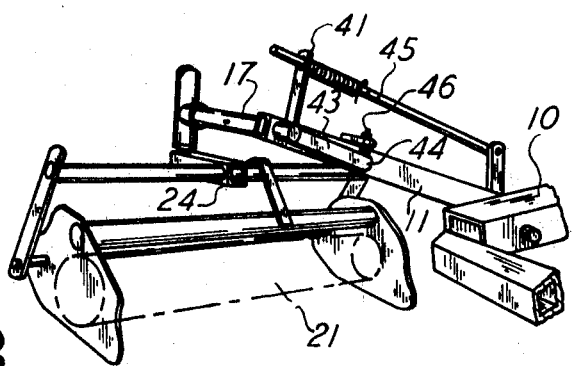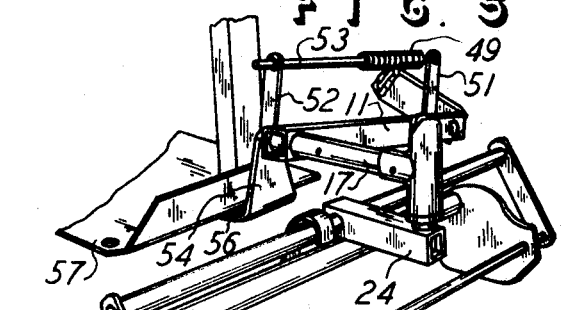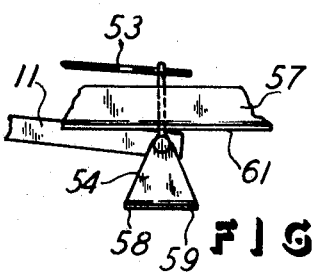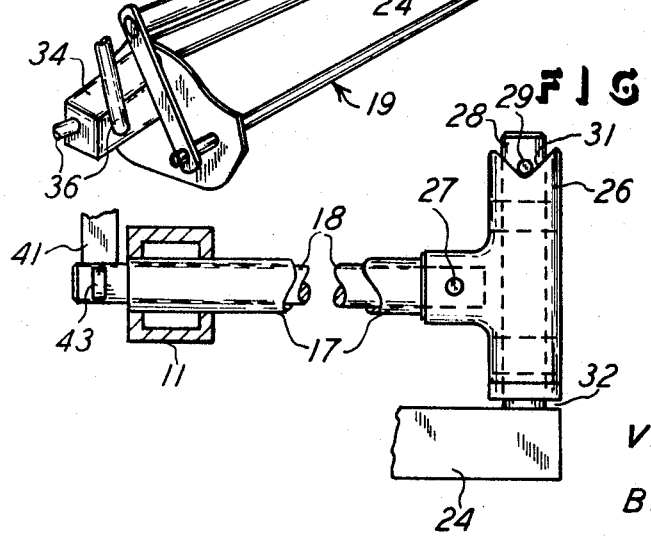
INVENTORS:
SHERMAN C. HETH
VERNON R. KAUFMAN
BY: Arthur J. Hansmann
ATTORNEY

3,514,926
LEVELER FOR A REEL-TYPE LAWN MOWER
Sherman C. Heth and Vernon R. Kaufman, Racine, Wis., assignors to Jacobsen Manufacturing Company, Racine, Wis., a corporation of Wisconsin
Filed Oct. 23, 1968, Ser. No. 769,886
Int. Cl. A01d 75/30
U.S. Cl. 56—7                                                                5 Claims

ABSTRACT OF THE DISCLOSURE

A leveler for a reel-type lawn mower, with a lift arm for raising and lowering the mower on a tractor or the like. A shaft and sleeve are telescoped together and disposed for interconnection between the mower and lift arm for pivotal movement of the mower about the axis of telescoping. One of the two telescoped members is rotatable, and a control arm is affixed to the rotatable member and there is an abutment which engages the control arm when the mower is raised, for holding the control arm, and an abutment cooperative with the control arm for restraining rotation of the rotatable member and to thereby hold the mower in a level position when raised.

BACKGROUND OF THE INVENTION

This invention relates to a leveler for a reel-type lawn mower. Specifically, this invention has application in gang-type lawn mowers, wherein a plurality of mowers are mounted on a tractor, and it is desirable to raise and lower the mowers between positions of transport and operation. Further, the invention is particularly concerned with mowers which are useful in mowing golf course greens, and it is desirable to retain the mowers in secure positions when they are raised, and it is also desirable to have the mowers level or parallel to the ground when they are being lowered. When the mowers are not secure in the transport or raised position, they then tend to swing and thereby cause damage to the parts of the mower and tractor, and they then also interfere with the smooth movement of the tractor over the ground. Also, when the mowers are not held level in the transport position, then when the mowers are lowered they have one end rest upon the ground before the other end reaches the ground, and this causes the mowers to make a hole or undesirable compaction in the ground. These aforementioned consequences are especially undesirable in a golf course greens mower.

The prior art is aware of means for holding mowers in the raised or transport position, and some mechanisms are utilized for the purpose of swinging or pivoting the mower into a folded or compact position with the tractor, so that a minimum of overall width is achieved by the tractor and the mowers combined. However, this prior art arrangement is not concerned with the problem of holding the mowers level or horizontal so that the mowers cannot swing in any direction and so that the mowers will be lowered onto the ground with a uniform pressure along the entire length of the mower and thereby avoid damaging the turf onto which the mowers are lowered.

Another feature of the prior art, and also another concern of the present invention, is the feature of mounting the mowers for universal or floating action so that the mowers can follow the contour of the ground and so that the mowers can steer relative to the tractor. The prior art has examples of mower mountings which achieve these desirable results, and such examples commonly include the arrangements of telescoping shafts and sleeves for the pivotal mounting of the mowers, both with respect to pivoting to adjust to the contour of the ground and with respect to pivoting for raising and lowering the mower on the tractor.

However, these prior art structures which do have the pivotal mounting mentioned as being desirable also have the problem of holding the mower against swinging or swaying when in the transport position, and they have the problem of holding the mower level for lowering it onto the ground. Accordingly, it is a general object of this invention to provide a mower mounting or leveler which overcomes the aforementioned problems attending the prior art structures.

More specifically, it is the object of this invention to provide a leveler for the type of mower which has the mountable pivotal axes for floating or pivotal motion of the mower when the mower is on the ground, and also for raising and lowering the mower.

Another object of this invention is to provide a leveler for a mower which has a mounting of the type including a centrally disposed pivotal axis, and to have the leveler effective to permit the pivotal mounting to be normally operative but yet have the mower secured in a level position when raised, even though the mower is heavier on one end relative to the central axis of pivot.

BRIEF DESCRIPTION OF THE DRAWING

FIG. 1 is a front perspective view of a mower shown on a fragment of a tractor, and showing the mower in the raised position and having one embodiment of this invention.

FIG. 2 is a view of a mower like that in FIG. 1, but as seen from the rear.

FIG. 3 is a side elevational view on an enlarged scale and showing the attachment between the lift arm and the mower of FIG. 1.

FIG. 4 is an elevational view of the lift arm and the abutment of FIG. 2, but with the parts thereof in a different position.

FIG. 5 is a view similar to FIG. 1 but showing another embodiment of this invention.

FIG. 6 is a rear elevation view of a fragment of FIG. 5, and showing the parts in a different position.

DETAILED DESCRIPTION OF THE PREFERRED EMBODIMENTS

A fragment of a tractor is shown in a tractor frame piece 10 which provides a pivotal mounting for a lift arm 11 pivoted at pin 12 affixed to the frame piece 10. It will also be understood that the arm 11 has lift means applied thereto for pivoting the arm about the pin 12, and such means is shown in FIG. 1 to include a hydraulic cylinder 13 and a lift plate 14 which engages a pin or roller 16 on the arm 11. Thus, in any conventional manner, the lift arm 11 is raised and lowered by a lift means supported on the tractor, and such means may include the hydraulic cylinder 13 and the lift plate 14 which is suitably attached to the ram of the cylinder 13, such attachment and the ram are not shown.

A combined sleeve and shaft unit are secured to the end of the arm 13, and the unit consists of the sleeve 17 and the shaft 18 which is telescoped within the sleeve 17, as shown in FIG. 3. The sleeve 17 is thus affixed to the arm 11, and the shaft 18 is rotatable within the sleeve 17. The longitudinal axis of the telescoped sleeve 17 and shaft 18 is therefore disposed centrally of a lawn mower generally designated 19, and the telescoping axis is also transverse to the longitudinal axis of the reel-type lawn mower 19.

The mower 19 is shown to consist of a conventional type of reel, indicated by dot-dash lines designated 21, and ground engaging rollers are included in the mower 19, such as the shown roller 22. A connecting yoke 23 extends between the mower 19 and the mower mounting which includes the sleeve 17 and shaft 18. Additional connecting and mounting pieces 24 and 26 connect between the yoke 23 and the shaft 18, as hereinafter described.

FIG. 3 shows the piece 26 is T-shaped, and the sleeve 17 abuts the piece 26 while the shaft 18 extends into the piece 26 and is secured thereto by a pin 27 passing through the piece 26 and the end of the shaft 18. The piece 26 can therefore rotate with the shaft 18 and thus rotate relative to the sleeve 17. A shaft 28 is freely disposed within the piece 26, and the lower end of the shaft connects to the piece 24 by welding or the like. The shaft 28 has a pin 29 extending therethrough, and the upper edge of the piece 25 has a V-groove 31 which abuts the end of the pin 29 and limits the downward movement of the shaft 28 in the piece 26. FIG. 3 further shows that the shaft 28 can move upwardly in the piece 26, at least to the extent that the space 32 exists between the piece 26 and the piece 24.

The piece 24 is also secured to the yoke 23, as by welding or the like, and the piece 24 is therefore rigid with the yoke 23 for raising and lowering the mower 19 upon pivoting the lift arm 11. A hook 33 is connected to the mower 19 and extends over the yoke 23 to impart the lifting motion from the piece 24 to the mower 19.

The mower 19 is commonly provided with a drive means, such as a hydraulic pump 34 shown in FIG. 5. Hydraulic lines 36 extend from the tractor to the pump 34, and thus the mower reel 21 is powered. The mower 19 is therefore unbalanced in its weight, by the presence of the pump 34, and this pump would be on the right-hand end of the mower 19 as viewed in FIG. 1. A compression spring 37 is effective to counter-balance the extra wieght of the pump 34 relative to the fore-and-aft axis of the mower 19. An upstanding arm 38 is affixed to the tractor frame 10 and it carries a rod 39 which receives the compression spring 37. Another upstanding arm 41 is connected to the rod 39 and is also connected to the end of the telescoped shaft 18, as by being welded thereto. The spring 37 is under compression, and it therefore causes the shaft 18 to be urged in a direction of rotation which counters the weight of the pump 34 and the attached hoses 36. In this manner, the mower 19 is balanced on the ground in the mowing position so that the end of the mower having the pump 34 will not create excessive pressure on the turf being mowed. As seen in FIG. 4, the spring 37 has one end affixed on the rod 39 by means of a stop 42. The arm 41 is free to slide along the rod 39 so that the end of the spring 37 abutting the arm 41 is displaceable on the rod 39. Also, stop 42 is adjustable along rod 39 by cotter pin holes 45, so the spring 37 can be extended and compressed to alter the spring pressure.

The aforementioned structure is for pivotal mounting of a mower on a tractor. A leveler or stabilizer means is provided for holding the mower 19 in a set position when the mower is raised, and it also provides a means for holding the mower in a level position so that the mower can be placed onto the ground without having one end of the mower indent the ground. A control arm 43 is affixed to the rear end of the shaft 18, as by welding or the like, and the arm extends transverse to the fore-and-aft direction of the mower 19. The extending end 44 of the arm 43 is therefore pivotal up and down, and it abuts a member 46 when the arm 11 is pivoted upwardly, such as the position shown in FIG. 2. When the lift arm 11 is pivoted upwardly, the compression spring 37 then holds the shaft 18 against rotation until the control arm 43 abuts the member 46 which is affixed to the tractor or lift arm 11. That is, with the pieces 38 and 41 extending to a level above the arm 11, the tension in the spring 37 is not altered to where it will lose its balance effect on the mower. This is true because of the parallelogram relation of pieces 38, 41, 39, and 11. The effective length of the spring 37 remains the same between the mower lowered operating position and the raised transport position where the arm end 44 first contacts stop 46. FIGS. 2 and 4 show the raised and lowered positions, respectively, and the attitude of the arm 43 is the same between these two positions. Therefore, the mower 19 remains horizontal at those positions.

The piece 46 is actually shown to be a screw 47 threadedly disposed in plate 48 affixed to the lift arm 11, as by welding or the like. Thus the screw 47 is adjustable toward and away from the arm 43, and thus upon abutting the screw 47, and upon further raising of the arm 11, the arm 43 pivots, and the amount of pivot and rotation of the shaft 18 is therefore adjustable.

With the compression spring 37 disposed above the arm 11, when the arm 11 is pivoted upwardly, the spring 37 is further compressed to assure the rotation of the shaft 18 and the pivot of the control arm 43, as described. The mower 19 is thus held in a secured position, and the mower cannot pivot in either direction with respect to the fore-and-aft axis of the mower, since the spring 37 is holding the shaft 18 against rotation in one direction, and the control arm 43 is holding the shaft 18 against rotation in the opposite direction, with respect to the raised position shown in FIG. 2. The entire arrangement, including the relationship of the mower mounting and leveler parts described, and including the consideration of the pressure in the spring 37 when the mower is in the lowered position of mowing, all provide for balancing the mower in the mowing position so that the weight of the pump 34 and the hoses 36 are properly balanced. Also, when the mower is in the raised position shown, the leveler mechanism is operative to hold the mower secure against swinging, and it is arranged so that when the mower is lowered to the mowing position the mower will be level until it reaches the ground. Further, with the mowers of FIGS. 1 and 2 being right and left hand mowers on the tractor, and adjacent each other on opposite ends of the piece 10, raising the arms 11 beyond the contact point of arms 43 with screws 47 will cause the adjacent inner ends of the mowers 19 to remain in a downward position while the sleeves 17 are raised. Thus the mowers pivot about their sleeves 17 to move away from each other and thereby provide clearance between the two close together mowers.

FIGS. 5 and 6 show another embodiment of the leveler, and the mower 19 is at least similar to the mower shown in FIG. 1, but the pump 34 and connections 36 are on an end of the mower 19 which is opposite from the end where the pump is mounted in FIG. 1. Therefore, a tension spring 49 is employed between the upright fixed arm 51 and an arm 52 on the rear end of the rotatable member or shaft 18. The spring rod 53 extends between the spring 49 and the arm 52, and the rod 53 is therefore a tension rod which pulls between the spring 49 and pull the arm 52 and thereby causes the spring 49 to urge or pull the arm 52 to the right in FIG. 5. This pull from the spring 49 urges the shaft 18 to rotate in the direction which counters the weight of the pump 34 shown in FIG. 5.

The leveler shown in FIG. 5 is of a different form from that shown in FIG. 2, and here it will be seen that a control arm 54 is connected to the end of the shaft 18, as by welding or the like. The arm 54 depends from the end of the shaft 18, and the arm 54 rotates with the rotation of the shaft 18 and thereby actually controls the position of the shaft 18 when the mower 19 is raised to the position shown in FIG. 5. That is, the arm 54 has a lower end 56 which extends to both sides of the central plane of the longitudinal axis of the shaft 18, and the end 56 abuts the tractor piece 57 when the mower 19 is raised. This abutting action thus controls the rotated position of the shaft 18, and it thereby secures the mower 19 against the swinging position, and it also holds the mower level, when the mower is raised.

The end 56 is therefore a section of the arm 54, and it has two ends 58 and 59, as indicated in FIG. 6, and these ends abut the surface 61 on the tractor piece 57, as identified in FIG. 6. Thus FIG. 6 shows the mower mounting arm 11 in the down position, and thus the control arm 54 is shown below the fixed tractor piece 57. However, upon pivoting the arm 11 upwardly, the arm 52 is held at its same attitude seen in FIG. 5, by the tension spring 49. When the control arms end 58 and 59 abut the tractor surface 61, the mower 19 is still held in a horizontal or level position, since the tractor surface 61 is normally horizontal or level on the tractor.

What is claimed is:

1. In a leveler for a reel-type lawn mower having a transverse axis extending across the fore-and-aft direction of said lawn mower and with the lawn mower being liftably mounted on a tractor and including a lift arm, a shaft and a sleeve telescoped together and with the longitudinal axis extending on the center plane of the fore-and-aft axis of said lawn mower and with one member of said shaft and said sleeve affixed to said lift arm and with an other member of said shaft and said sleeve rotatable about said longitudinal axis, said rotatable member being connected with said lawn mower for up and down pivotal movement of said lawn mower about said longitudinal axis upon rotation of said rotatable member, a control arm affixed to said rotatable member and being movable with the raising of said lift arm and with the rotation of said rotatable member, and an abutment supported from said tractor in the path of movement of said control arm for engaging said control arm upon the raising of said lift arm, the improvement comprising said control arm and said abutment being arranged to be in abutting contact upon raising of said lift arm and said lawn mower for suspending said lawn mower with its said transverse axis in a level position, and means cooperative with said control arm and effective on said rotatable member for holding said lawn mower level and against swinging movement on said tractor.

2. The subject matter of claim 1, wherein said means includes a spring interconnected with said rotatable member for urging said rotatable member in one direction of rotation.

3. The subject matter of claim 2, wherein said mower is heavier on one transverse end along said transverse axis and said spring is arranged to urge said mower about the axis of said rotatable member in a direction to counterbalance said heavier end.

4. The subject matter of claim 3, wherein said spring is mounted relative to said lift arm in a position to increase tension in said spring in response to raising said lift arm and said lawn mower.

5. The subject matter of claim 1, wherein said means includes a section on an extending end of said control arm, said section extending transverse to the direction of the fore-and-aft axis of said lawn mower and including two ends on opposite sides of said center plane of said mower and forming the transverse extent of said section and disposed for said abutting contact with said abutment.

References Cited
UNITED STATES PATENTS

| 2,724,227 | 11/1955 | Godwin | 56—7 |
| 2,764,864 | 10/1956 | Kinkead | 56—7 |
| 3,038,286 | 6/1962 | Hall | 56—7 |
| 3,177,638 | 4/1965 | Johnson | 56—26 XR |
| 3,248,864 | 5/1966 | Barth | 56—26 |

LOUIS G. MANCENE, Primary Examiner

J. A. OLIFF, Assistant Examiner